(12) United States Patent
Smith

(10) Patent No.: US 10,649,508 B1
(45) Date of Patent: May 12, 2020

(54) MODULATED HEATING/COOLING SYSTEM CONTROL

(71) Applicant: Computime, Ltd., New Territories (HK)

(72) Inventor: Philip John Smith, Guangdong (CN)

(73) Assignee: Computime Ltd., New Territories (HK)

(*) Notice: Subject to any disclaimer, the term of this patent is extended or adjusted under 35 U.S.C. 154(b) by 0 days.

(21) Appl. No.: 16/280,237

(22) Filed: Feb. 20, 2019

(51) Int. Cl.
*G06F 1/20* (2006.01)

(52) U.S. Cl.
CPC ........ *G06F 1/206* (2013.01); *G06F 2200/201* (2013.01)

(58) Field of Classification Search
CPC .......................... G06F 1/206; G06F 2200/201
See application file for complete search history.

(56) References Cited

U.S. PATENT DOCUMENTS 7,730,935 B1 * 6/2010 Bujak, Jr. ................. F24F 3/06
165/208

2017/0219219 A1 * 8/2017 Miller ................. F24D 19/1012
2018/0039292 A1 * 2/2018 van Berkel ............... F24F 11/30

OTHER PUBLICATIONS

"ACTIVAL Motorized Three-Way Valve" Dec. 2017, by Azbil Corporation (Year: 2017).*

* cited by examiner

*Primary Examiner* — Yuhui R Pan
(74) *Attorney, Agent, or Firm* — Banner & Witcoff, Ltd.

(57) ABSTRACT

A heating/cooling system modulates the temperature of water flowing through a hydronic emitter by mixing water flows through a mixing valve. The mixing valve has an inlet connect to a water flow pipe, an inlet connected to a water return pipe, and an outlet connected to the hydronic emitter. Water flows through the inlets are configured to obtain a desired mixed water flow at a targeted temperature through the outlet. A controller receives temperature information from a thermometer and then determines the targeted temperature of the outlet. The controller then determines an inlet ratio and configures the mixing valve based on the ratio. The heating/cooling system may support one or more heating/cooling zones and may operate either in a heating or a cooling mode.

15 Claims, 12 Drawing Sheets

MODULATED HEATING/COOLING SYSTEM CONTROL

TECHNICAL FIELD

Aspects of the disclosure relate to thermally modulating individual radiators, underfloor heating circuits, chilled beams or fan-coils of a heating/cooling system.

BACKGROUND OF THE INVENTION

Heating/cooling systems with hydronic emitters (including radiators, underfloor heating/cooling circuits, fan coils, chilled beams) are based on power transfer from one or more of the hydronic emitters to affect one or more environmental entities (for example, offices, apartments, conference rooms, and the like). Traditional approaches often modulate the flow temperature directly from the boiler, where only a single available modulated output is available. Traditional approaches may support two separate heating outputs, but costs increase dramatically with dual outputs. Consequently, with traditional approaches multiple heating zones for a building may be economically impracticable. Moreover, in accordance with traditional approaches, a special modulating heat source (for example, a boiler) may be required. Achieving a low flow temperature, as may be required during times when the outside weather conditions are mild (such as during the spring and autumn), cannot normally be achieved with flow temperature directly from the boiler. This limitation results in the modulating thermostatic control having to revert to "on/off" control rather than using modulating control when a low-load situation is encountered due to the modulating boiler being incapable of modulating down to low flow temperatures.

SUMMARY OF THE INVENTION

An aspect supports a hydronic heating/cooling system having a mixing valve that mixes water flows from a water flow pipe and a water return pipe. The mixed water flows through an outlet of the mixing valve to a hydronic emitter that either heats or cools a controlled entity such as a room, office, or conference room.

With another aspect, a hydronic heating/cooling systems controls multiple heating/cooling zones, where each zone spans separate controlled entities and has a corresponding mixing valve and hydronic emitter.

With another aspect, a targeted temperature of an outlet of a mixing value is determined from temperature information from a thermostat. A water flow ratio of two inlets of the mixing value may then be obtained from the targeted temperature. The mixing valve may then be configured through an actuator based on a water flow ratio. The water flow ratio may be adjusted so that a measured temperature of an outlet of a mixing value approximately equals the targeted temperature.

With another aspect, an actuator includes a motor, an electrical signal is applied to the motor, and the electrical signal characterized by an electrical voltage value. The electrical voltage causes the motor to adjust a mixing valve to pass the water flows through the first A inlet and the first B inlet in accordance with an inlet ratio. The electrical voltage value may be based on a targeted outlet temperature at the outlet of the mixing valve.

With another aspect, when a measured temperature of an outlet of a mixing valve is within a desired temperature range, a controller waits a predetermined time duration for the system to thermally stabilize before obtaining updated first temperature information. The controller then generates an updated targeted temperature for the outlet of the mixing valve.

BRIEF DESCRIPTION OF THE DRAWINGS

The foregoing summary of the invention, as well as the following detailed description of exemplary embodiments of the invention, is better understood when read in conjunction with the accompanying drawings, which are included by way of example, and not by way of limitation with regard to the claimed invention.

DETAILED DESCRIPTION

According to traditional approaches, heating systems typically use typically "on/off" thermostatic controls. These traditional approaches involve monitoring the room temperature with a thermostatic control and turning the heating on or off to maintain the room temperature as close as possible to the room setpoint temperature. Modulating thermostatic controls may modulate the water flow temperature such that as the room temperature approaches the room setpoint temperature, the water flow temperature is reduced. The result is that modulation control may be advantageous over simple "on/off" control because room temperature variation may be decreased by temperature over-shoot or temperature under-shoot and may be more energy efficient. With traditional approaches, modulation controls consist of two parts: 1) a modulating thermostatic control that monitors the room temperature and the room setpoint and 2) a modulating appliance (boiler) that modulates the water flow temperature.

As an example, according to traditional approaches, a standardized communication protocol is used such that the thermostatic control requests the boiler to provide the required flow water temperature to control the room temperature to achieve the room setpoint. Different modulating appliances and controls may use different protocols. However, different thermostatic controls may be needed for different modulating appliances. There are disadvantages with traditional modulating controls.

In accordance with traditional approaches, modulating the flow temperature directly from the boiler may provide only a single available modulated output is available. Traditional approaches may support two separate heating outputs, but costs increase dramatically with dual outputs. Consequently, with traditional approaches multiple heating zones for a building may be economically impracticable.

In accordance with traditional approaches, a special modulating heat source (for example, a boiler) may be required. Achieving a low flow temperature, as may be required during times when the outside weather conditions are mild (such as during the spring and autumn), normally cannot be achieved with flow temperature directly from the boiler. This results in the modulating thermostatic control having to revert to "on/off" control rather than using modulating control when a low-load situation is encountered due to the modulating boiler being incapable of modulating down to low flow temperatures.

To address the above deficiencies, modulation control may utilize one or more three or four port mixing valve(s) together with an electronic control to provide an enhanced modulation control to the heating/cooling emitters.

Figure 1:
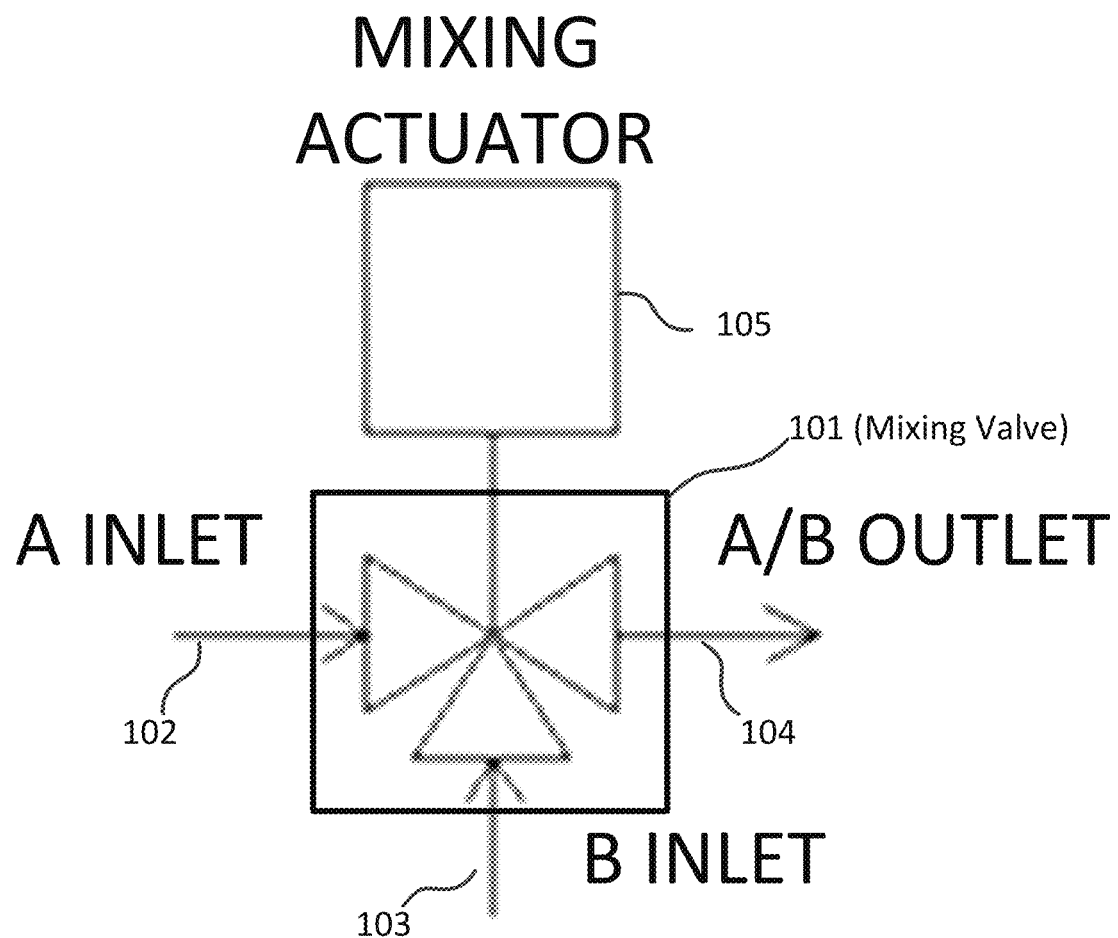
FIG. 1 shows a mixing valve in accordance with an embodiment.

FIG. 1 shows mixing valve 101 in accordance with an embodiment. Mixing valve 101 includes A inlet 102, B inlet 103, and A/B outlet 104. As will be discussed in further detail, water flows through inlets 102 and 103 are controlled by actuator 105, resulting in a mixed water flow through outlet 104.

While FIG. 1 shows a three-port mixer, some embodiments may utilize a four-port mixer, where a B inlet has two connections. Operation may be similar as with a three-port mixer.

Figure 2:
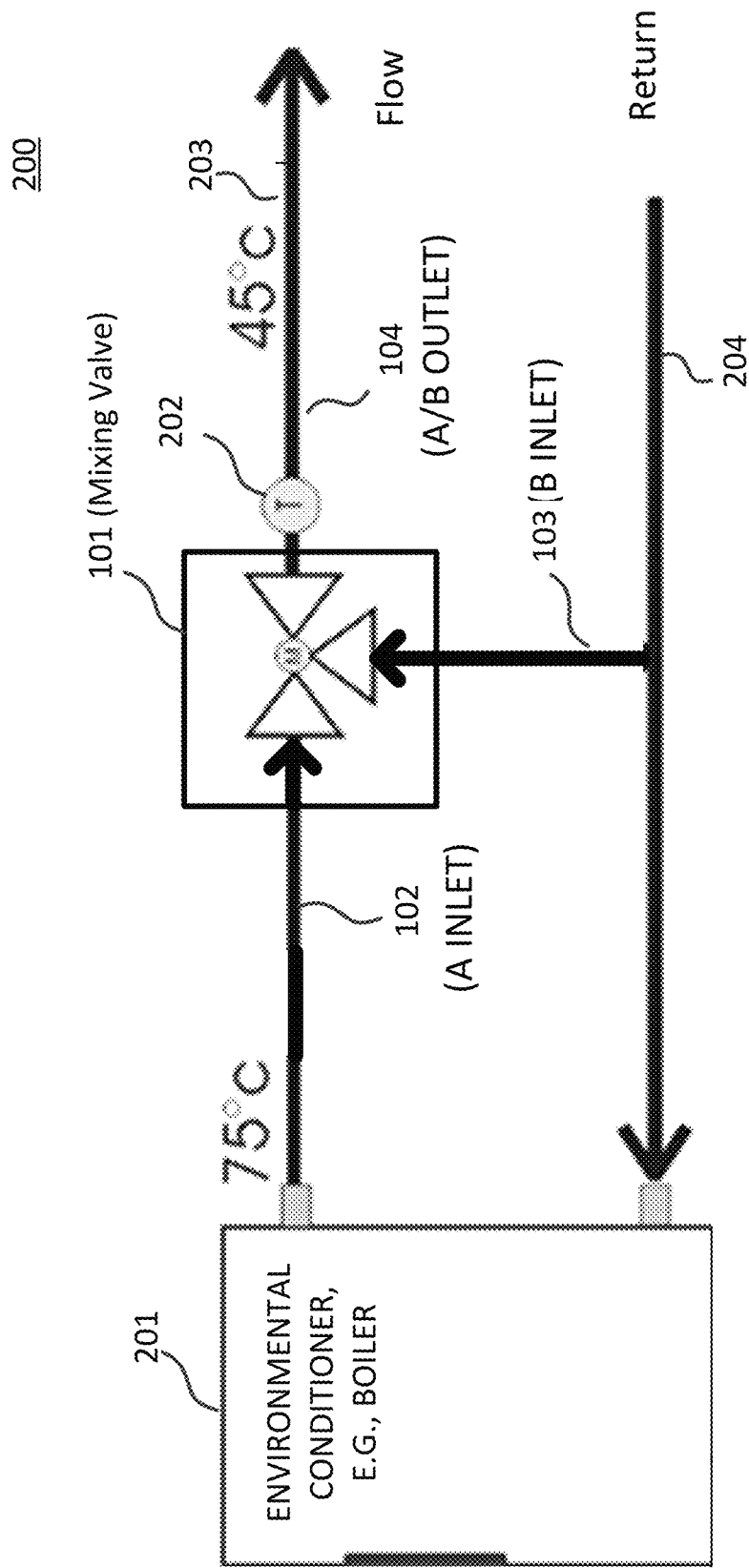
FIG. 2 shows a hydronic heating/cooling system in accordance with an embodiment.

FIG. 2 shows hydronic heating system 200 in accordance with an embodiment. With valve modulation control, A inlet 102 is fed from heat generator (boiler) 201 with heated water typically between 70° C. and 90° C. (shown at 75° C. in FIG. 2) through flow pipe 203.

B Inlet 103 is fed from return pipe 204 of the hydronic emitters (for example, radiators in a radiator-based heating system). Water flow through return pipe 204 typically has a lower temperature (typically 10° C. lower than through flow pipe 203) due to heat being extracted from the radiator from the radiator water flow. A/B outlet 104 water flow is fed to hydronic emitters (for example, radiators).

Mixing valve 101 mixes water flow from heat generator 201 through A inlet 102 and water flow from return pipe 204 through B inlet 103 to obtain a mixed water flow through A/B outlet 104. The proportion may be varied, for example, to allow 100% from A and 0% from B, 0% from A and 100% from B, or any ratio in-between.

An actuator (shown as actuator 105 in FIG. 1) is connected to mixing valve 101 to control and alter the A/B flow ratio to obtain the required (targeted) flow temperature at A/B outlet 104 as will be discussed in further detail.

As will be further discussed, heating system 200 determines a targeted outlet temperature at A/B outlet 104 and measures the actual outlet temperature through temperature sensor 202.

Figure 3:
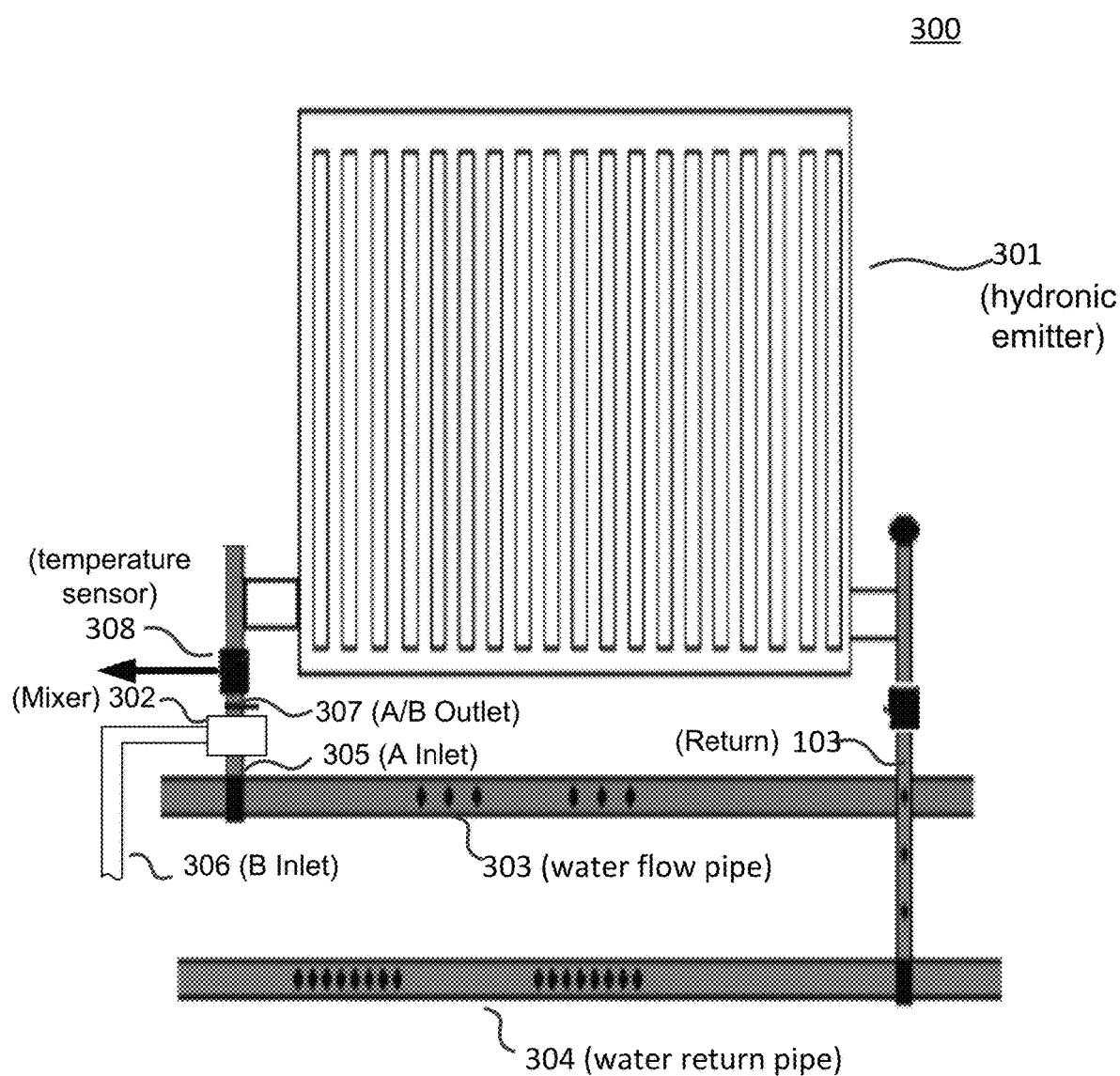
FIG. 3 shows a hydronic emitter within a hydronic heating/cooling system in accordance with an embodiment.

FIG. 3 shows hydronic emitter 301 within a hydronic heating/cooling system 300. When hydronic heating/cooling system 300 is operating in a heating mode, heated water flows through hydronic emitter 301 (including radiators, underfloor heating/cooling circuits, fan coils, chilled beams) via water flow pipe 303, mixing valve 302, and A/B outlet 307 and exits emitter 301 via return 103 and water return pipe 304.

Mixing valve 302 provides a mixed water flow to emitter 301 by appropriately mixing water flows from A inlet 305 and B inlet 306 so that a measured temperature measured by temperature sensor 308 approximately equals a targeted temperature as will be discussed in further detail.

While hydronic system 300 operates in a heating mode, hydronic system may also support a cooling mode. When in the cooling mode, an environmental conditioner (for example, a heat exchanger) provides chilled water to hydronic emitter 301 via water flow pipe 303, mixing valve 302, and A/B outlet 307.

Figure 4:
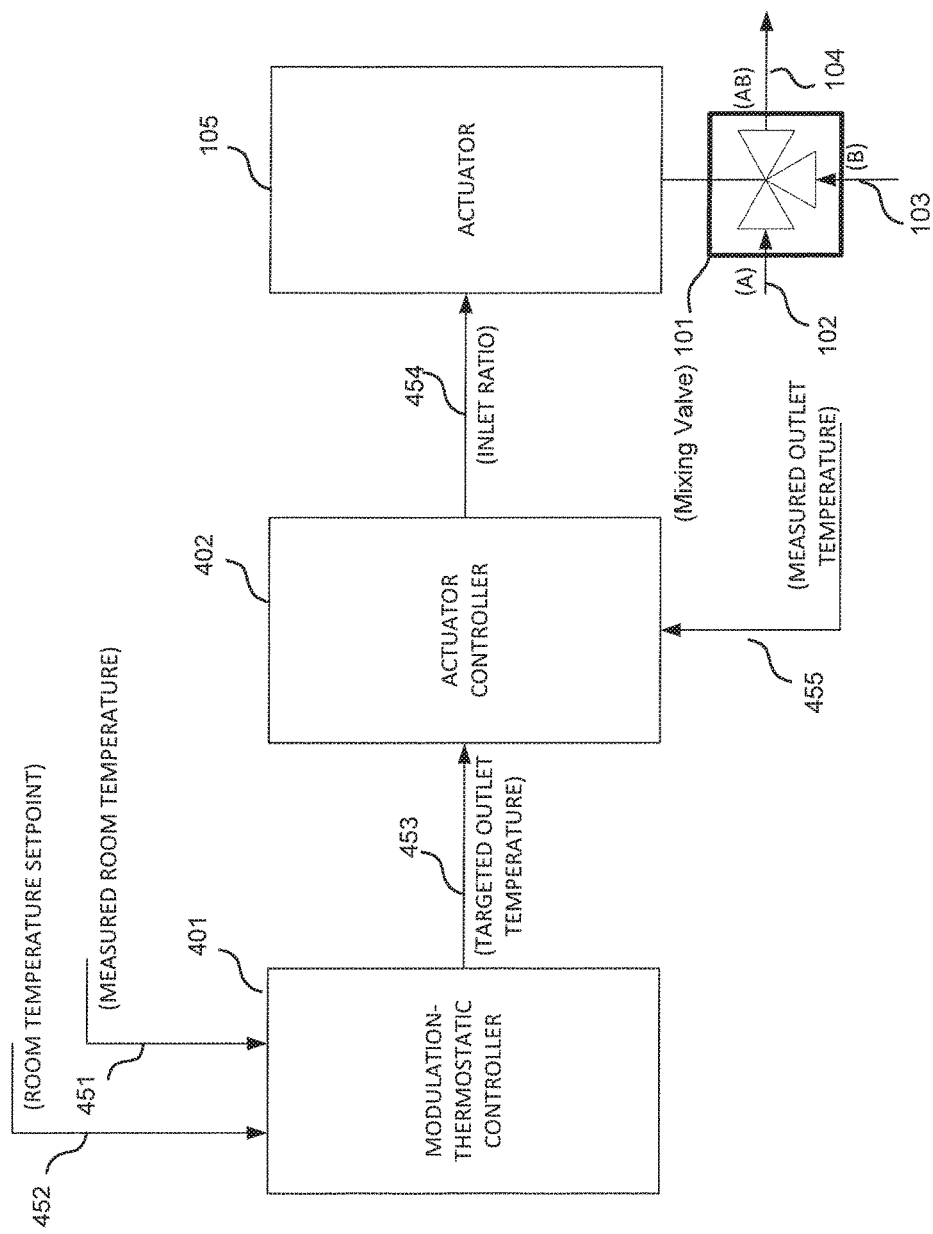
FIG. 4 shows a controller component of a hydronic heating/cooling system in accordance with an embodiment.

FIG. 4 shows a controller component of a hydronic heating/cooling system in accordance with an embodiment. The controller component comprises modulation-thermostatic controller 401 and actuator controller 402.

With an embodiment, actuator 105 (also shown in FIG. 1) configures mixing valve 101 (also shown in FIG. 1) and actuator to obtain a desired flow temperature to a hydronic emitter (not explicitly shown).

Modulation-thermostatic controller 401 receives temperature information (for example, a measured room temperature 451 and temperature setpoint 452) from a thermostat situated in a thermally-controlled entity (for example, an office, apartment, conference room, and the like). Modulation-thermostatic controller 401 then determines targeted outlet temperature 453 of the associated A/B outlet (not explicitly shown). The determination may be performed through different ways, including a lookup table or predetermined relationship between the temperature information 451 and 452 and targeted outlet temperature 453.

Actuator controller 402 receives targeted outlet temperature 453 from modulation-thermostatic controller 401. Actuator controller 402 then determines inlet ratio 454 that corresponds to the targeted outlet temperature 453 and measured outlet temperature 455 (for example, provided by temperature sensor 308 shown in FIG. 3). Inlet ratio 454 is indicative of a water flow ratio of the A inlet 102 to the first B inlet 103 needed to obtain a first desired mixed water flow through A/B outlet 104 of mixing valve 101.

With some embodiments, the voltage of an electrical signal to actuator 105 from actuator controller 402 may be indicative or inlet ratio 454. Control of mixing valve 101 may be performed by actuator 105 such as an open/close motorized actuator or a 0-10 v control actuator.

An open/close motorized actuator control may be supported by moving actuator 105 in the open or close direction by applying a fixed voltage normally 24 VAC or 240 VAC. If actuator 105 is opened more, water flow through A inlet 102 increases and water flow through B inlet 103 decreases. If actuator 105 is closed more, water flow though A inlet 102 decreases and water flow through B inlet 103 increases.

With 0-10 VDC control, greater precision is possible with actuator 105. When 0 v is applied to the actuator 105, water flow though A inlet 102 is 0% and water flow through B inlet 103 is 100%. When 2.5 v is applied to actuator 105, water flow through A inlet 102 is 25% and water flow through B inlet 103 is 75%. When 5 v is applied to actuator 105, water flows through A inlet 102 and B inlet 103 are both at 50%. When 10 v is applied to actuator 105, water flow through A inlet 102 is 100% and water flow through B inlet 103 is 0%.

To provide control of the desired mixed water flow through A/B outlet 104, temperature sensor 308 (as shown in FIG. 3) may be placed on the A/B outlet 104 such that actuator 105 can control A/B outlet 104 to be at targeted (desired) temperature. For example, when heating/cooling system 200 is operating in a heating mode and when A/B outlet 104 is below the targeted temperature, mixing valve 101 needs to allow more water flow through A inlet 102 and less water flow through B inlet 103. When A/B outlet 104 is above the targeted temperature, then mixing valve 101 needs to allow less water flow through A inlet 102 and more water flow through B inlet 103.

Figure 5:
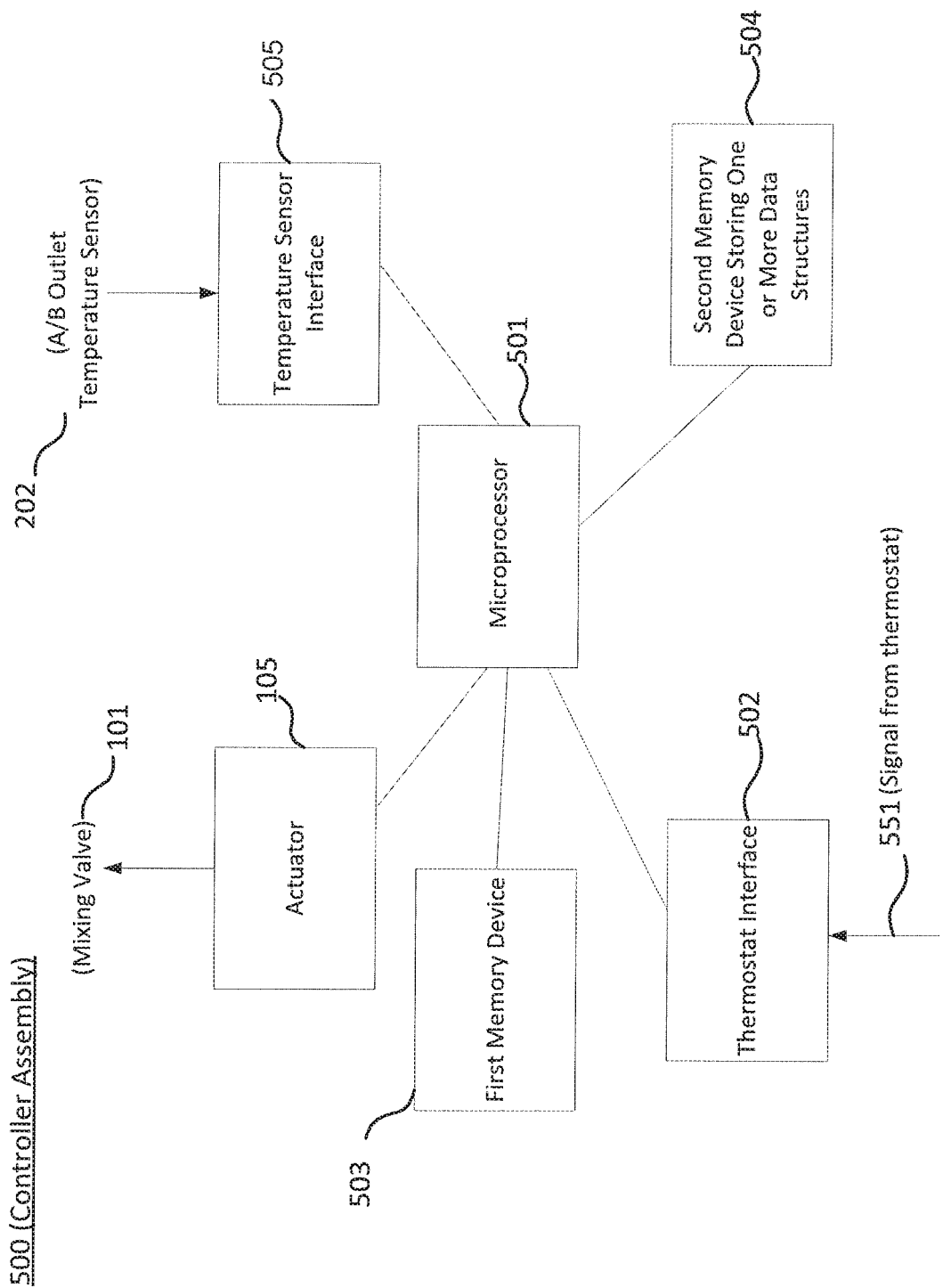
FIG. 5 shows a controller assembly of a hydronic heating/cooling system in accordance with an embodiment.

FIG. 5 shows controller assembly 500 of a hydronic heating/cooling system in accordance with an embodiment. Controller assembly 500 may provide the controlling capabilities of the controller component shown in FIG. 4.

Controller assembly 500 obtains thermostat signal 551, which may be indicative of the temperature set point and current room temperature via thermostat interface 502. Controller assembly 500 may receive signal 551 through various communication media, including wireless or wired channels using different communication protocols.

Processor 501 processes signal 551 in accordance with computer readable instructions obtained from memory device 503. For example, the computer readable instructions may reflect flowchart 900 and/or flowchart 1000 shown in FIGS. 9 and 10, respectively, as will be discussed. Based on information obtained from signal 551, processor 501 controls water flow though hydronic emitter 301 (as shown in FIG. 3) by configuring valve mixer 101 through actuator 105.

Processor 501 also obtains measured temperatures measured at A/B outlet 104 (as shown in FIG. 1) via temperature sensor interface 505 from temperature sensor 202.

With some embodiments, processor 501 obtains the room temperature and temperature setpoint extracted from signal 551 and consequently determines a targeted temperature for A/B outlet 104. For example, processor 501 may perform this determination from a lookup table stored at memory device 504.

With reference to FIG. 5, the computing system environment may include a computing device wherein the processes discussed herein may be implemented. The computing device may have a processor 501 for controlling overall operation of the computing device and its associated components, including RAM, ROM, communications module, and memory devices 503 and 504. The computing device typically includes a variety of computer readable media. Computer readable media may be any available media that may be accessed by computing device and include both volatile and nonvolatile media, removable and non-removable media. By way of example, and not limitation, computer readable media may comprise a combination of computer storage media and communication media.

Computer storage media may include volatile and non-volatile, removable and non-removable media implemented in any method or technology for storage of information such as computer readable instructions, data structures, program modules or other data. Computer storage media include, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by the computing device.

Communication media typically embodies computer readable instructions, data structures, program modules or other data in a modulated data signal such as a carrier wave or other transport mechanism and includes any information delivery media. Modulated data signal is a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

With some embodiments, memory devices 503 and 504 may be physically implemented within a single memory device.

Controller assembly 500 may be implemented in a centralized or a distributed manner. When centralized, assembly 500 may be located at a single position to control one or more heating/cooling zones. When distributed, assembly 500 may dispersed over a plurality of positions. For example, as shown in FIG. 6, separate controllers for each heating/cooling zone may be located near each of the corresponding hydronic emitter.

Figure 6:
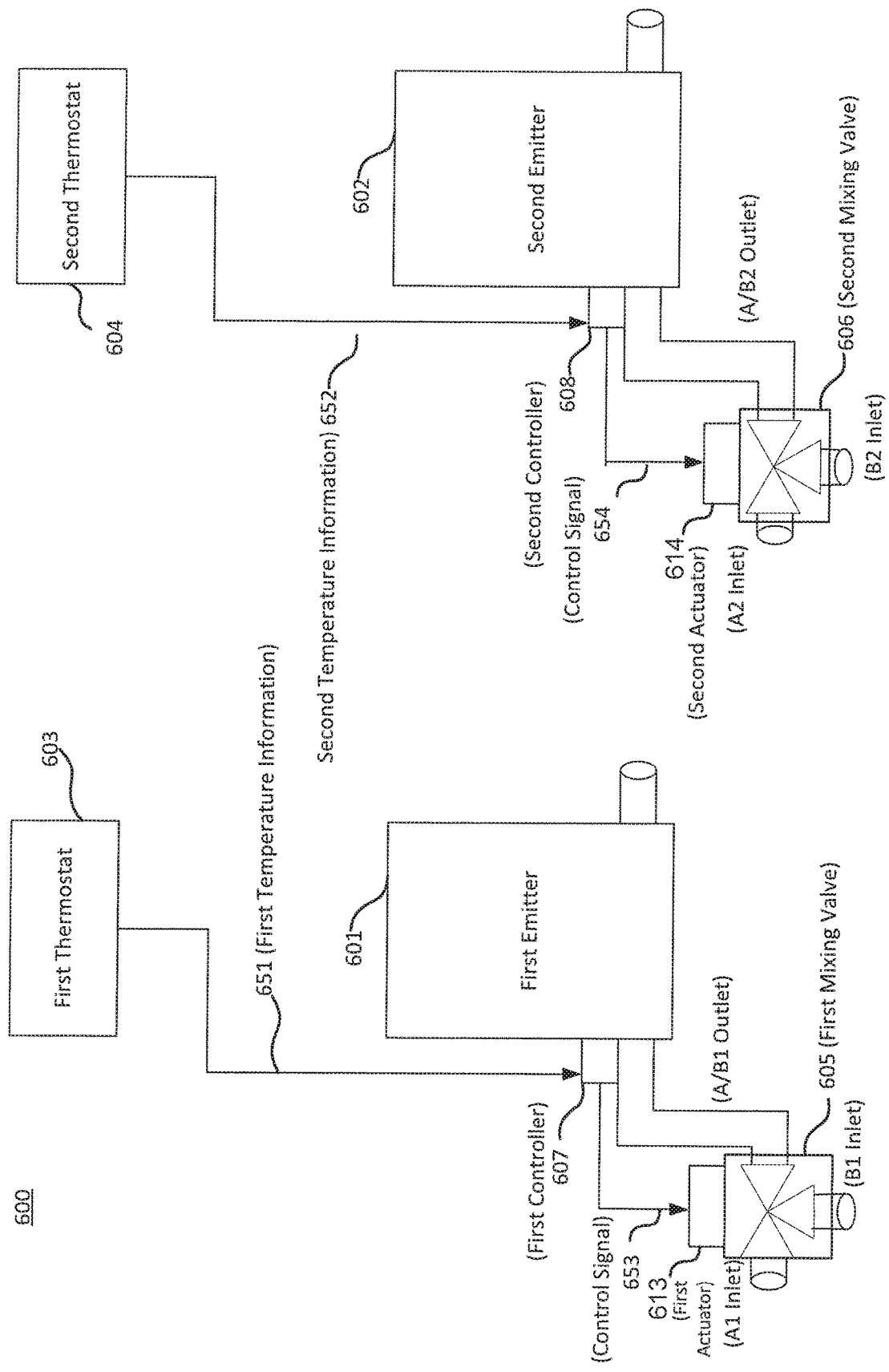
FIG. 6 shows a heating/cooling system with two control zones in accordance with an embodiment.

FIG. 6 shows a heating/cooling system 600 with two heating/cooling zones in accordance with an embodiment.

Traditional approaches often have only a single thermostat and consequently do not support multiple thermostats. With traditional approaches, an environmental conditioner (for example, a boiler) provides a single water temperature applicable to the entire building structure.

With an aspect of the embodiments, water flow is controlled separately for different hydronic emitters associated with different portions (for example, rooms) of the building structure (for example, a house) rather than at the boiler itself. Consequently, embodiments may support multiple heating/cooling zones.

Using a mixing valve to provide a modulated flow temperature may have several advantages to a traditional approach of using a modulating boiler directly to provide the flow temperature. For example, when upgrading to modulation control, the existing non-modulating boiler may be used. Modulation may be used with any type of heat generator such as electric boiler, solid fuel boiler, oil fired boiler or District Heating (DH) systems. Multiple mixing valves may be used to provide multi-zone modulation control from one single heat generator. In addition, low temperature output is possible to provide modulation even at low-load conditions.

Referring to FIG. 6, two heating/cooling zones are supported, where the first zone and second zones are configured through thermostats 603 and 604, respectively and where first and second zones are heated/cooled by hydronic emitters 601 and 602, respectively. Thermostats 603 and 604 provide first and second temperature information 651 and 652, respectively, which may include room temperature and temperature setpoints for each zone.

Water flow though hydronic emitter 601 is controlled via controller 607, actuator 613, and mixing valve 605, while water flow through hydronic emitter 602 is controlled via controller 608, actuator 614, and mixing valve 606. Actuator 613 configures mixing valve 605 in accordance with control signal 653 while actuator 614 configures mixing valve 606 in accordance with control signal 654. As previously discussed with FIG. 4, control signals 653 and 654 may convey control information via voltage characteristics of the signal.

Figure 7A:
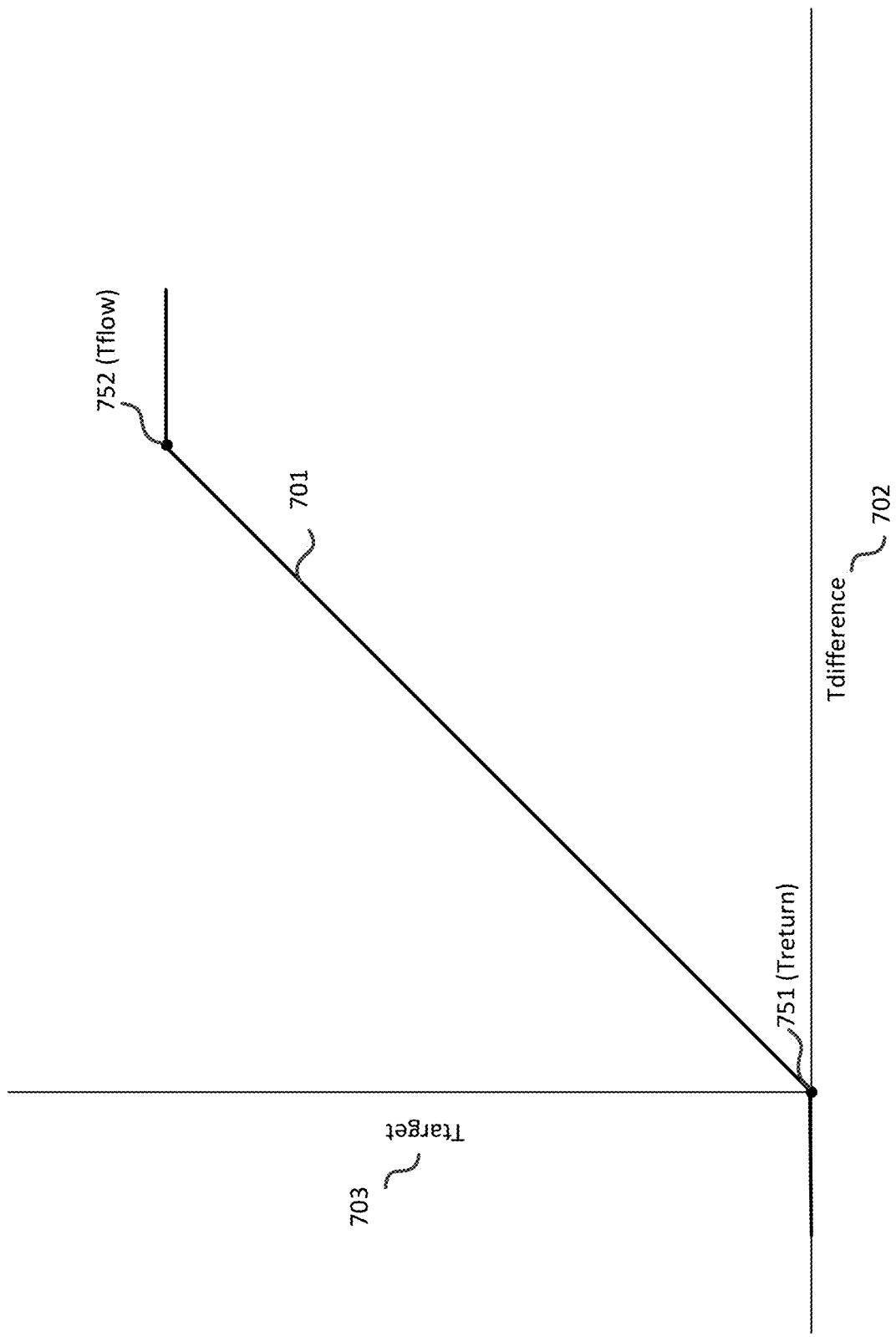
FIG. 7A shows a relationship between a targeted temperature of an outlet of a mixing valve and temperature information from a thermostat when a heating/cooling system is operating in a heating mode in accordance with an embodiment.

FIG. 7A shows relationship 701 between targeted temperature 703 of an outlet of a mixing valve and temperature difference 702 when a heating/cooling system is operating in a heating mode. Temperature difference 702 may be derived from temperature information (for example, information 451 and 452 as shown in FIG. 4) provided by a thermostat by subtracting a measured temperature of the controlled entity (for example, a room temperature) from a temperature setpoint.

Because heated water from water flow pipe 303 (as shown in FIG. 3) is mixed with water from water return pipe 304, targeted temperature 703 varies between the temperature of flow pipe 303 and return pipe 304 (in other words, between $T_{flow}$ and $T_{return}$). With some embodiments, $T_{flow}$ and $T_{return}$ may be known a priori or may be measured by temperature sensors at flow pipe 303 and return pipe 304, respectively.

Figure 7B:
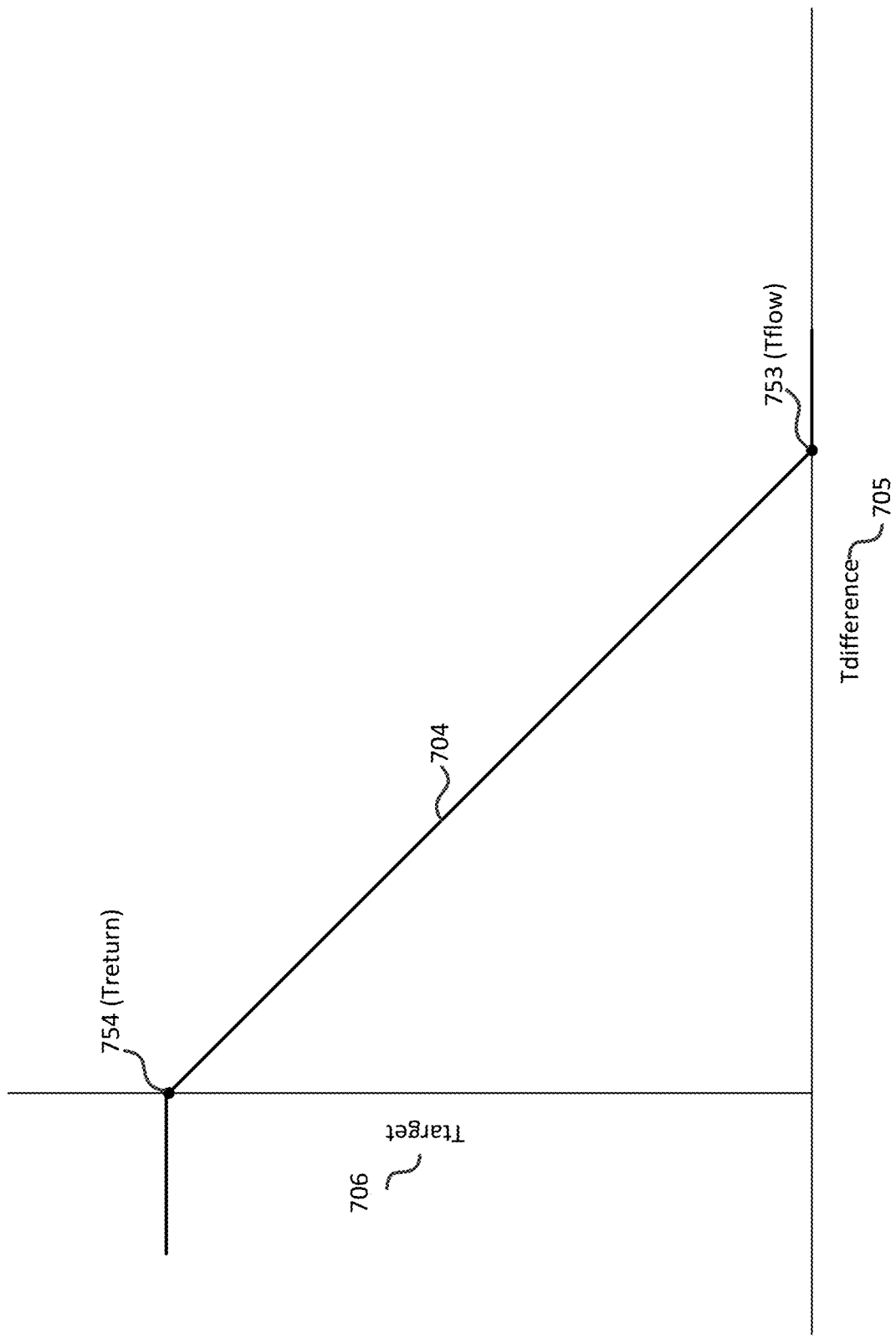
FIG. 7B shows a relationship between a targeted temperature of an outlet of a mixing valve and temperature information from a thermostat when a heating/cooling system is operating in a cooling mode in accordance with an embodiment.

FIG. 7B shows relationship 704 between targeted temperature 706 of an outlet of a mixing valve and temperature difference 705 when a heating/cooling system is operating in a cooling mode. Temperature difference 705 may be obtained from temperature information (for example, information 451 and 452 as shown in FIG. 4) from a thermostat by subtracting a temperature setpoint from a measured temperature of the controlled entity (for example, the room temperature).

Because chilled water from water flow pipe 303 (as shown in FIG. 3) is mixed with water from water return pipe 304, targeted temperature 703 varies between the temperature of flow pipe 303 and return pipe 304 (in other words, between $T_{flow}$ and $T_{return}$). With some embodiments, $T_{flow}$ and $T_{return}$ may be known a priori or may be measured by temperature sensors at flow pipe 303 and return pipe 304.

Figure 8A:
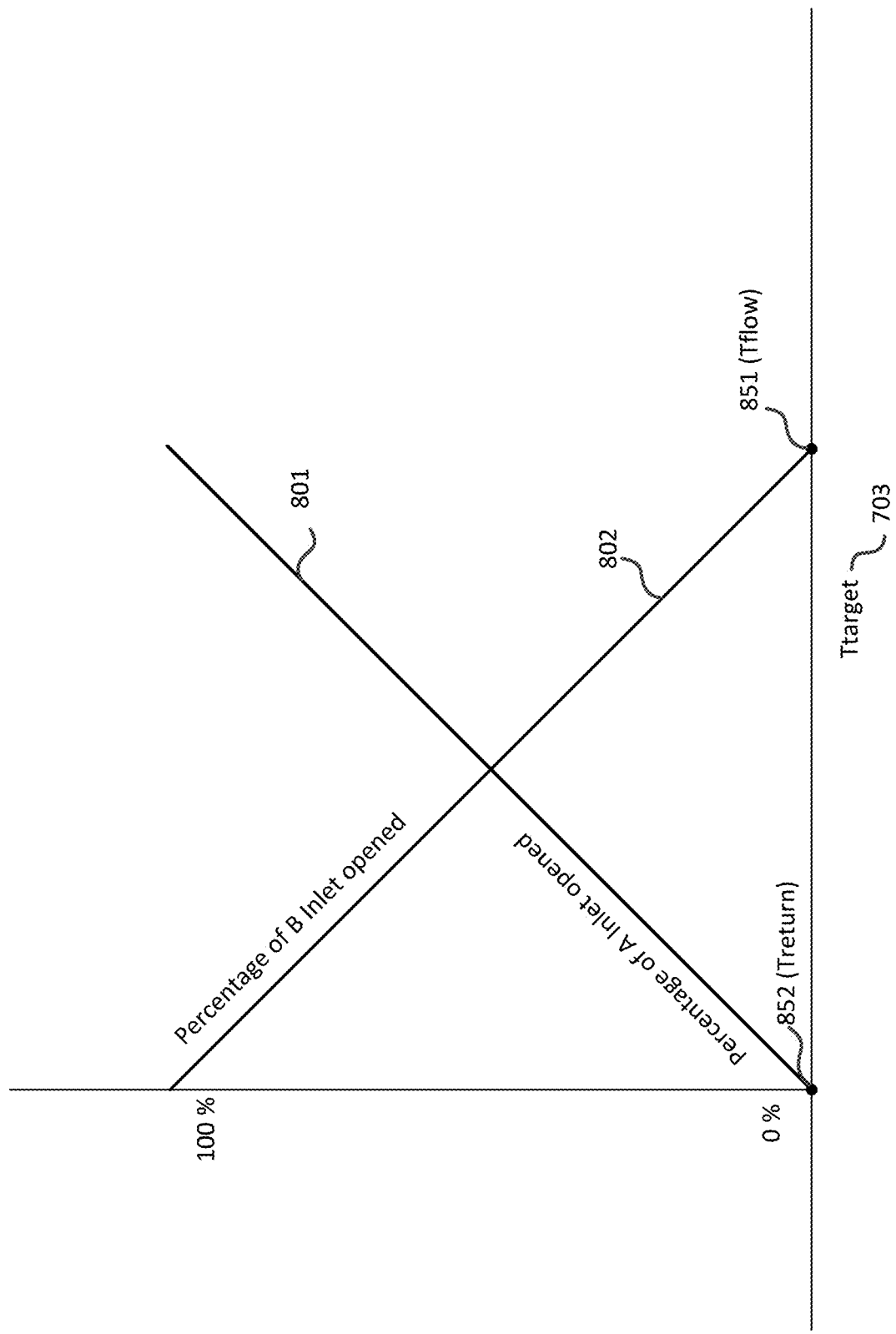
FIG. 8A shows relative water flows though inlets of a valve mixer when a heating/cooling system is operating in a heating mode in accordance with an embodiment.

FIG. 8A shows relative water flows though inlets of a valve mixer when a heating/cooling system is operating in a heating mode. Percentage 801 (corresponding to a A inlet of a mixing valve) and percentage 802 (corresponding to a B inlet) are based on targeted temperature 703 obtained from the relationship shown in FIG. 7A (operating in a heating mode), where percentage 801 to percentage 802 equals an inlet ratio and where percentage 801 plus percentage 802 equals 100%.

Figure 8B:
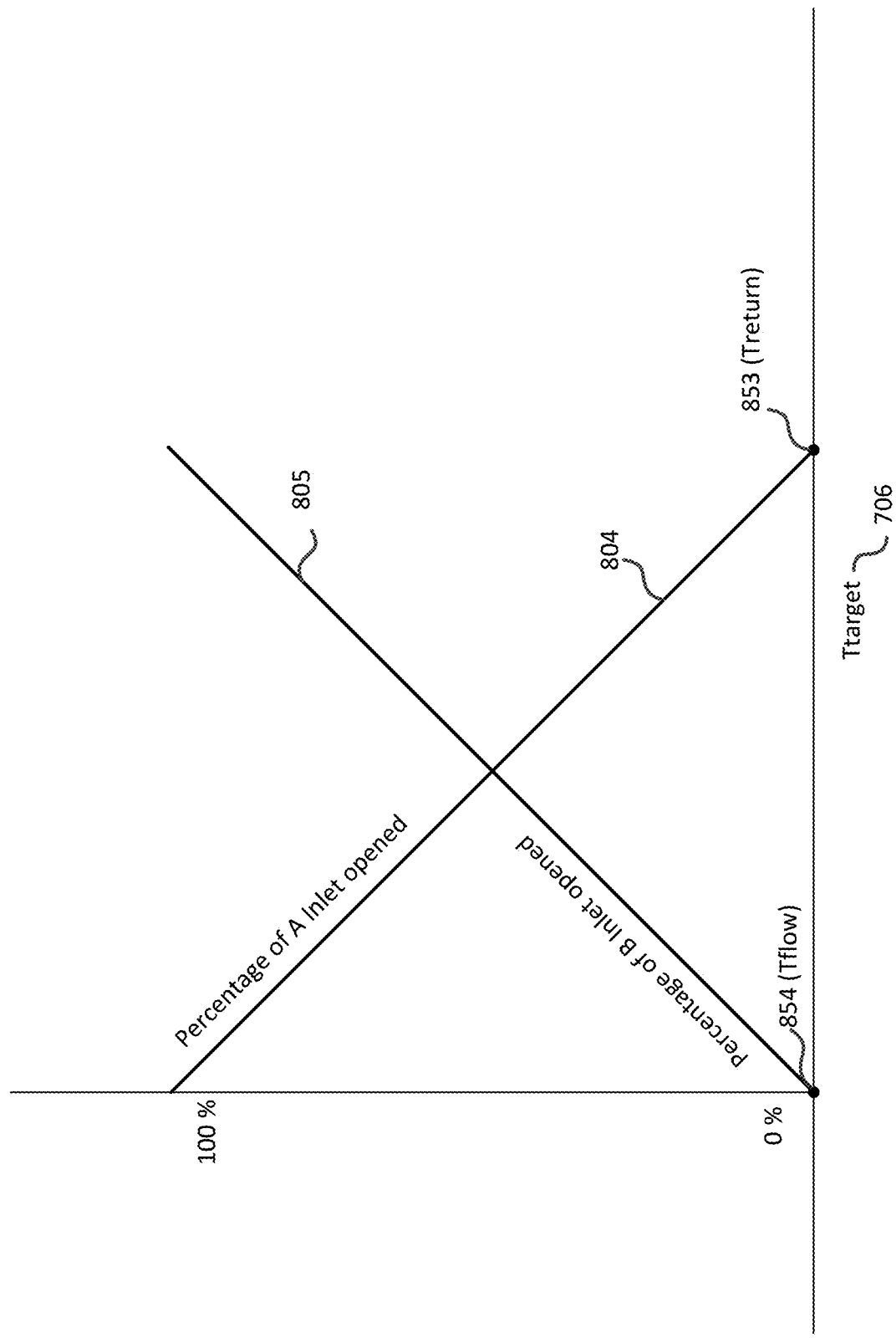
FIG. 8B shows relative water flows though inlets of a valve mixer when a heating/cooling system is operating in a cooling mode in accordance with an embodiment.

FIG. 8B shows relative water flows though inlets of a valve mixer when a heating/cooling system is operating in a cooling mode. Percentage 804 (corresponding to a A inlet of a mixing valve) and percentage 805 (corresponding to a B inlet) are based on targeted temperature 706 obtained from the relationship shown in FIG. 7B, where percentage 804 to percentage 805 equals an inlet ratio and where percentage 804 plus percentage 805 equals 100%.

Figure 9:
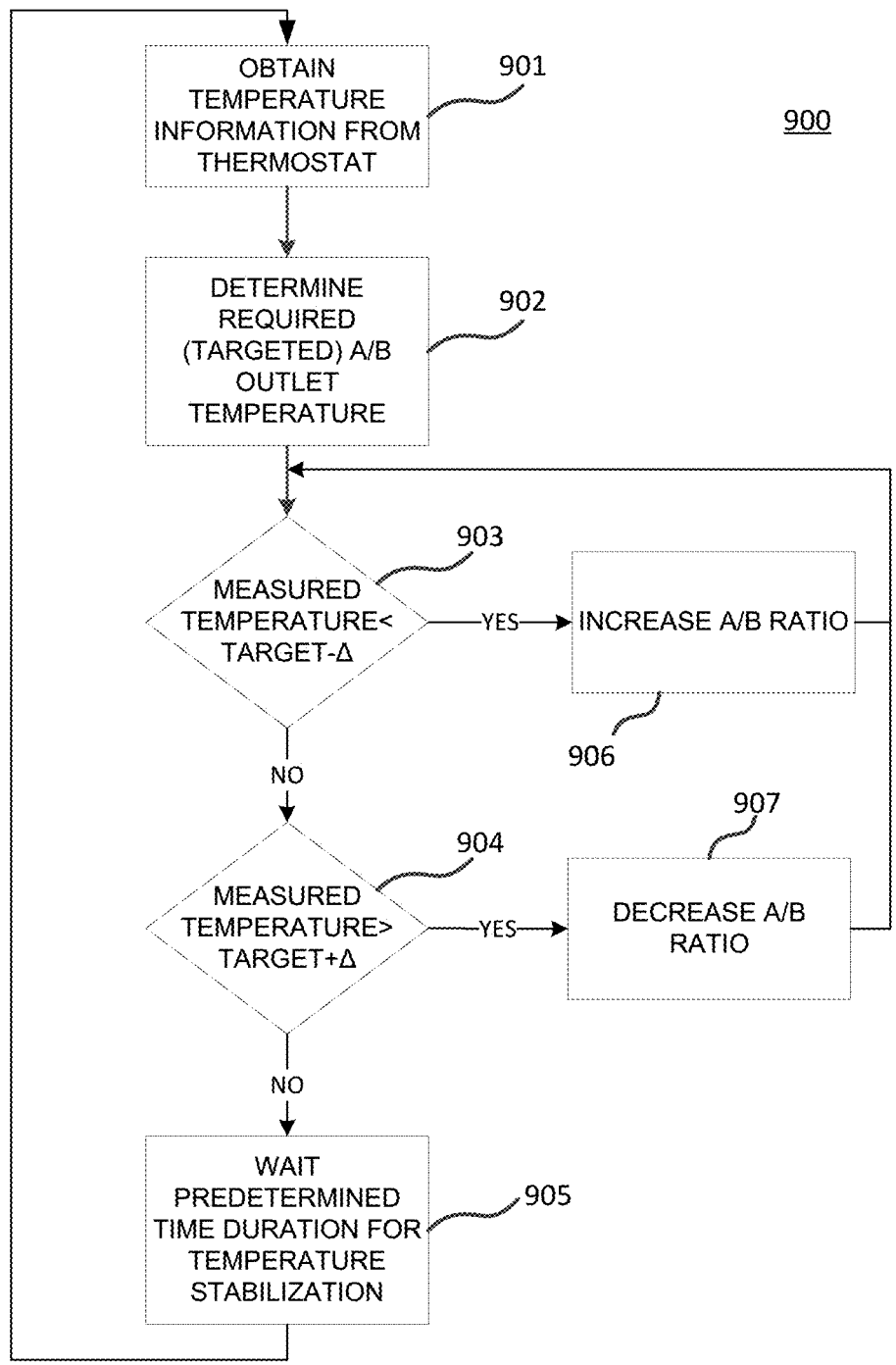
FIG. 9 shows a flowchart for a heating/cooling system when operating in a heating mode in accordance with an embodiment.

FIG. 9 shows flowchart 900 for a heating/cooling system when operating in a heating mode in accordance with an embodiment.

At block 901, controller assembly 500 (as shown in FIG. 5) obtains temperature information from a thermostat via thermostat interface 502. The temperature information may include a measured room temperature and a temperature setpoint. Based on the temperature information, a targeted temperature of the A/B outlet of the corresponding mixing valve is determined at block 902.

At blocks 903, 904, 906, and 907 controller assembly 500 adjusts the openings of A inlet and B inlet of the mixing valve to obtain the targeted temperature of the A/B outlet. For example, with an open/close motorized actuator control, actuator 105 may be instructed to open or close inlet openings in an incremental manner based on a determined inlet ratio, thus resulting with the targeted temperature at the A/B outlet. However, as previously discussed, some embodiments may utilize an actuator with 0-10 volt control, where the voltage value directly maps to the inlet ratio. Consequently, execution of blocks 903, 904, 906, and 907 may be accelerated by applying a determined voltage value to actuator 105.

Blocks 903, 940, 906, and 907 are executed until the measured temperature at the A/B outlet is within a temperature range of the targeted temperature±Δ, where Δ is a predetermined offset.

When the measured A/B outlet temperature is within the temperature range, controller assembly 500 waits a predetermined time duration for the heating/cooling system to thermally stabilize and obtains updated temperature information at block 901. Process 900 is then repeated with the updated temperature information.

Figure 10:
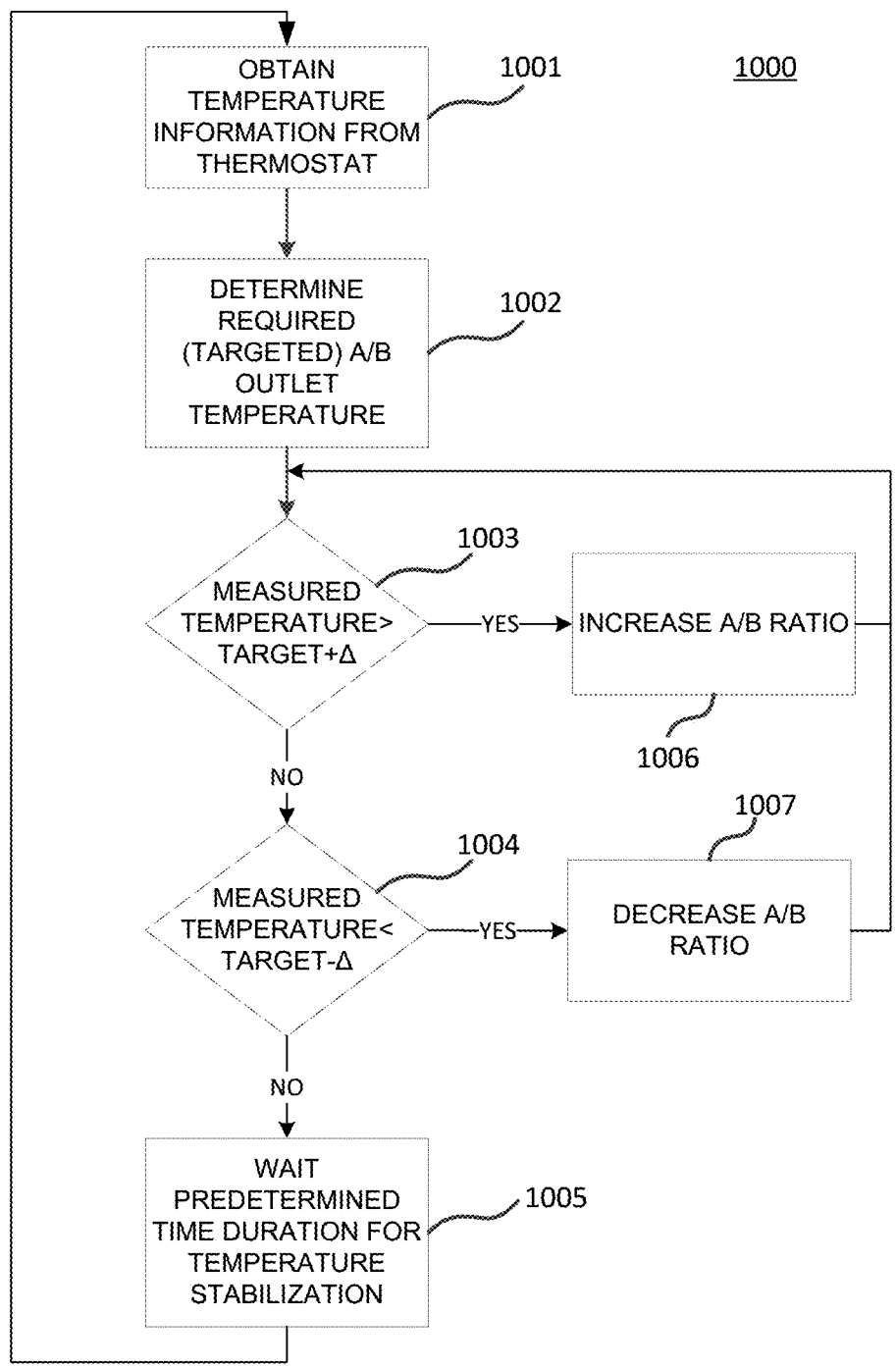
FIG. 10 shows a flowchart for a heating/cooling system when operating in a cooling mode in accordance with an embodiment.
Figure 2:
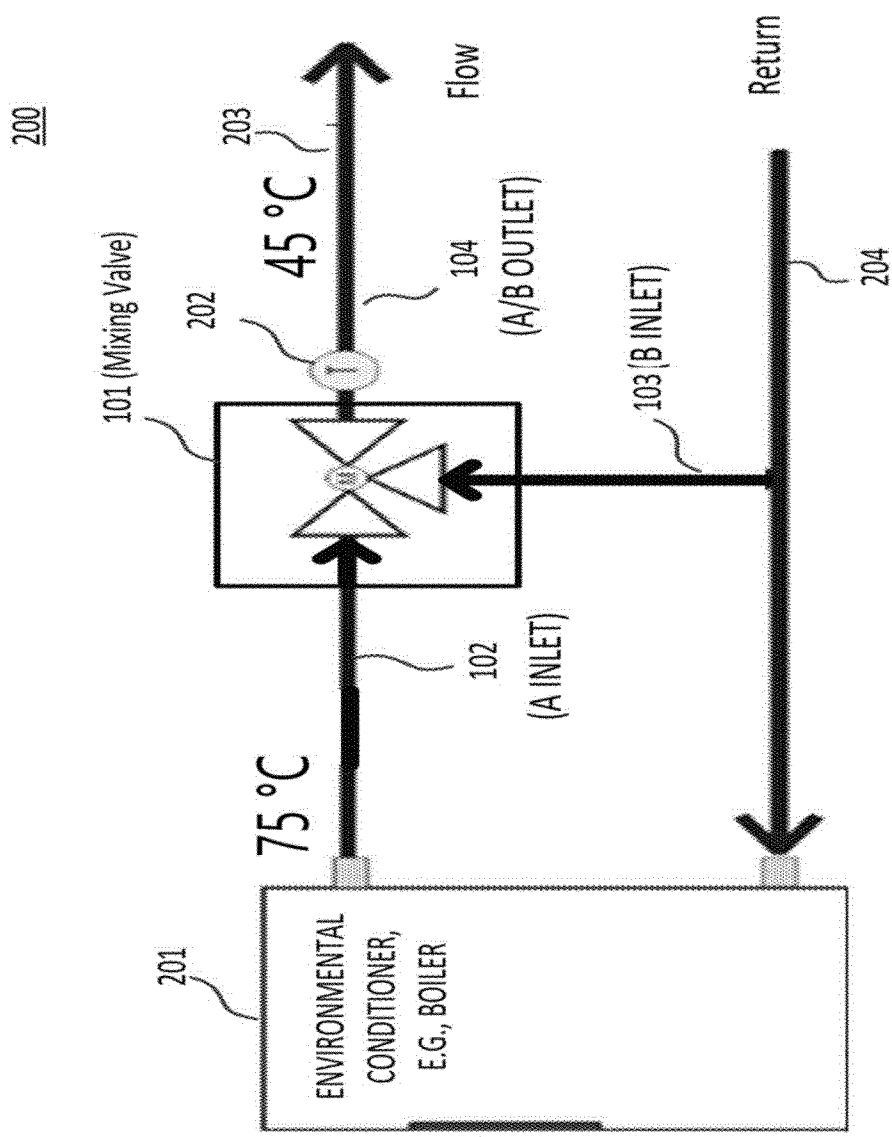
Figure 4:
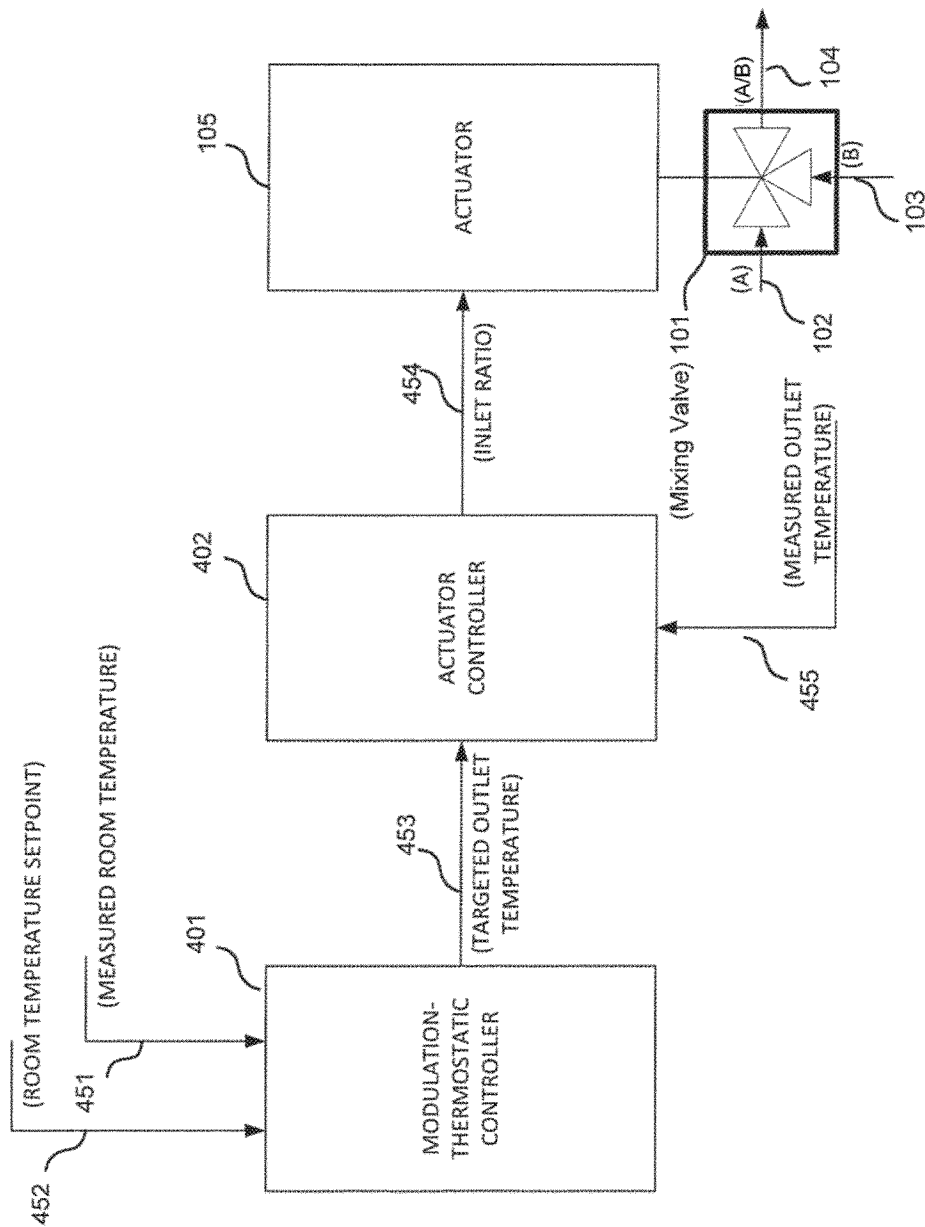

FIG. 10 shows flowchart 1000 for a heating/cooling system when operating in a cooling mode in accordance with an embodiment. Flowchart 1000 is similar to flowchart 900, where blocks 1001-1007 correspond to blocks 901-907, respectively. However, blocks 1003 and 1004 are appropriately modified to operate in the cooling mode.

As can be appreciated by one skilled in the art, a computer system with an associated computer-readable medium containing instructions for controlling the computer system can be utilized to implement the exemplary embodiments that are disclosed herein. The computer system may include at least one computer such as a microprocessor, digital signal processor, and associated peripheral electronic circuitry.

What is claimed is:

1. A hydronic heating/cooling system comprising:
a first mixing valve, the first mixing valve including a first A inlet, a first B inlet and a first A/B outlet, the first A inlet connected to a water flow pipe from an environmental conditioner, the first B inlet connected to a water return pipe, the first A/B outlet connected a first hydronic emitter;
a modulation-thermostatic controller configured to receive first temperature information about a first controlled entity and to generate, from the first temperature information, a first targeted outlet temperature for the first A/B outlet, wherein the hydronic heating/cooling system affects environmental conditions of the first controlled entity;
an actuator controller configured to determine a first inlet ratio from the first targeted outlet temperature and a first measured outlet temperature at the first A/B outlet, the first inlet ratio indicative of a first water flow ratio of the first A inlet to the first B inlet;
a first actuator connected to the first mixing valve, the first actuator configured to control first water flows through the first A inlet and the first B inlet based on the first inlet ratio and to obtain a first desired mixed water flow through the first A/B outlet of the first mixing valve;
the actuator controller configured to determine an updated inlet ratio from the first targeted outlet temperature and an updated measured outlet temperature at the first A/B outlet, wherein the updated inlet ratio is indicative of an updated water flow ratio of the first A inlet to the first B inlet of the first mixing valve;
the first actuator configured to control updated mixing valve water flows through the first A inlet and the first B inlet based on the updated inlet ratio;
the modulation-thermostatic controller configured to wait a predetermined time duration before obtaining updated first temperature information when the first measured outlet temperature of the first A/B outlet is within a desired temperature range, wherein the desired temperature range is specified by a predetermined offset temperature value; and the modulation-thermostatic controller configured to generate, from the updated first temperature information, an updated first targeted outlet temperature for the first A/B outlet of the first mixing valve.

2. The hydronic heating/cooling system of claim 1, further comprising:

a second valve mixer, the second valve mixer including a second A inlet, a second B inlet and a second A/B outlet, the second A inlet connected to the water flow pipe from the environmental conditioner, the second B inlet connected to the water return pipe, the second A/B outlet connected a second hydronic emitter;

the modulation-thermostatic controller configured to receive second temperature information about a second controlled entity and to generate a second targeted outlet temperature for the second A/B outlet, wherein the hydronic heating/cooling system affects environmental conditions of the second controlled entity;

the actuator controller configured to determine a second inlet ratio from the second targeted outlet temperature and a second measured outlet temperature at the second A/B outlet, the second inlet ratio indicative of a second water flow ratio of the second A inlet to the second B inlet; and a second actuator connected to the second mixing valve, the second actuator configured to control second water flows through the second A inlet and the second B inlet based on the second inlet ratio and to obtain a second desired mixed water flow through the second A/B outlet of the second mixing valve.

3. The hydronic heating/cooling system of claim 2, wherein the environmental conditioner is a single thermal generator.

4. The hydronic heating/cooling system of claim 1, further comprising:

a temperature sensor configured to provide a signal to the actuator controller, the signal indicative of the first measured outlet temperature of water flowing through the first A/B outlet.

5. The hydronic heating/cooling system of claim 1, wherein the first actuator comprises a motor, an electrical signal is applied to the motor, and the electrical signal is characterized by an electrical voltage value and wherein the electrical voltage value causes the motor to adjust the first mixing valve to pass the first water flows through the first A inlet and the first B inlet in accordance with the first inlet ratio.

6. The hydronic heating/cooling system of claim 5, wherein the electrical voltage value is based on a temperature difference between the first targeted outlet temperature at the first A/B outlet and the first measured outlet temperature at the first A/B outlet.

7. A method for controlling water flowing through at least one hydronic emitter of a heating/cooling system, the method comprising:

receiving first temperature information about a first controlled entity;

generating, from the first temperature information, a first targeted outlet temperature for a first A/B outlet of a first mixing valve;

measuring a first measured outlet temperature of the first A/B outlet of the first mixing valve;

determining a first inlet ratio from the first targeted outlet temperature and the first measured outlet temperature at the first A/B outlet, wherein the first inlet ratio is indicative of a first water flow ratio of a first A inlet to a first B inlet of the first mixing valve;

instructing a first actuator to configure the first mixing valve to allow water flows through the first A inlet and the first B inlet based on the first inlet ratio to obtain a first desired mixed water flow through the first A/B outlet, wherein a first hydronic emitter is connected to the first A/B outlet, the first desired mixed water flow flows through the first hydronic emitter, and wherein the first hydronic emitter affects environmental conditions of the first controlled entity;

measuring an updated measured outlet temperature of the first A/B outlet of the first mixing valve;

determining an updated inlet ratio from the first targeted outlet temperature and the updated measured outlet temperature at the first A/B outlet, wherein the updated inlet ratio is indicative of an updated water flow ratio of the first A inlet to the first B inlet of the first mixing valve, the determining further comprising:

including a predetermined offset temperature value to specify a desired temperature range, instructing the first actuator to configure the updated mixing valve water flows through the first A inlet and the first B inlet based on the updated inlet ratio;

when the first measured outlet temperature of the first A/B outlet is within the desired temperature range, waiting a predetermined time duration before obtaining updated first temperature information; and generating, from the updated first temperature information, an updated first targeted outlet temperature for the first A/B outlet of the first mixing valve.

8. The method of claim 7 further comprising:

receiving second temperature information about a second controlled entity;

generating, from the second temperature information, a second targeted outlet temperature for a second A/B outlet of a second mixing valve;

measuring a second outlet temperature of the second A/B outlet of the second mixing valve;

determining a second inlet ratio from the second targeted outlet temperature and the second measured outlet temperature at the second A/B outlet, wherein the second inlet ratio is indicative of a second water flow ratio of a second A inlet to a second B inlet of the second mixing valve; and instructing a second actuator to configure the second mixing valve to allow water flows through the second A inlet and the second B inlet based on the second inlet ratio to obtain a second desired mixed water flow through the second A/B outlet, wherein a second hydronic emitter is connected to the second A/B outlet, the second desired mixed water flow flows through the second hydronic emitter, and wherein the second hydronic emitter affects environmental conditions of the second controlled entity.

9. The method of claim 7 further comprising:

applying, to the first actuator, an electrical signal characterized by an electrical voltage value, the electrical voltage value causing the first mixing valve to pass the first water flows through the first A inlet and the first B inlet in accordance with the first inlet ratio.

10. The method of claim 9 further comprising:
updating the electrical voltage value based on a temperature difference between the first targeted outlet temperature and the first measured outlet temperature at the first A/B outlet.

11. The method of claim 7 further comprising:
when the heating/cooling system is operating in a heating mode, determining the first inlet ratio based on the first targeted outlet temperature.

12. The method of claim 7 further comprising:
when the heating/cooling system is operating in a cooling mode, determining the first inlet ratio based on the first targeted outlet temperature.

13. A computing device controlling a hydronic heating/cooling system, the computing device comprising:
at least one processor; and
at least one memory device storing computer-readable instructions that, when executed by the processor, cause the computing device to perform:
receiving first temperature information about a first controlled entity;
generating, from the first temperature information, a first targeted outlet temperature for a first A/B outlet of a first mixing valve;
obtaining a first measured outlet temperature of the first A/B outlet of the first mixing valve;
determining a first inlet ratio from the first targeted outlet temperature and the first measured outlet temperature at the first A/B outlet, wherein the first inlet ratio is indicative of a first water flow ratio of a first A inlet to a first B inlet of the first mixing valve;
instructing a first actuator to configure the first mixing valve to allow water flows through the first A inlet and the first B inlet based on the first inlet ratio to obtain a first desired mixed water flow through the first A/B outlet, wherein a first hydronic emitter is connected to the first A/B outlet, the first desired mixed water flow flows through the first hydronic emitter, and wherein the first hydronic emitter affects environmental conditions of the first controlled entity;
obtaining an updated measured outlet temperature of the first A/B outlet of the first mixing valve;
determining an updated inlet ratio from the first targeted outlet temperature and the updated measured outlet temperature at the first A/B outlet, wherein the updated inlet ratio is indicative of an updated water flow ratio of the first A inlet to the first B inlet of the first mixing valve;
instructing the first actuator to configure the updated mixing valve water flows through the first A inlet and the first B inlet based on the updated inlet ratio;
waiting a predetermined time duration before obtaining updated first temperature information when the first measured outlet temperature of the first A/B outlet is within a desired temperature range, wherein the desired temperature range is specified by a predetermined offset temperature value; and
generating, from the updated first temperature information, an updated first targeted outlet temperature for the first A/B outlet of the first mixing valve.

14. A computing device of claim 13, wherein the at least one memory device stores computer-readable instructions that, when executed by the at least one processor, cause the computing device to perform:
receiving second temperature information about a second controlled entity;
generating, from the second temperature information, a second targeted outlet temperature for a second A/B outlet of a second mixing valve;
obtaining a second measured outlet temperature of the second A/B outlet of the second mixing valve;
determining a second inlet ratio from the second targeted outlet temperature and the first measured outlet temperature at the first A/B outlet, wherein the second inlet ratio is indicative of a second water flow ratio of a second A inlet to a second B inlet of the second mixing valve; and
instructing a second actuator to configure the second mixing valve to allow water flows through the second A inlet and the second B inlet based on the second inlet ratio.

15. A computing device of claim 13, wherein the at least one memory device stores computer-readable instructions that, when executed by the at least one processor, cause the computing device to perform:
applying, by the first actuator, an electrical signal characterized by an electrical voltage value, the electrical voltage value causing the first mixing valve to pass the first water flows through the first A inlet and the first B inlet in accordance with the first inlet ratio.

\* \* \* \* \*

UNITED STATES PATENT AND TRADEMARK OFFICE
CERTIFICATE OF CORRECTION

PATENT NO. : 10,649,508 B1
APPLICATION NO. : 16/280237
DATED : May 12, 2020
INVENTOR(S) : Smith It is certified that error appears in the above-identified patent and that said Letters Patent is hereby corrected as shown below:

On the Title Page

Column 1, item (71) Applicant, Line 1:
Delete "Computime," and insert --Computime--

In the Drawings

Sheet 2 of 12, Fig. 2:
Delete "75°c" and insert --75 °C-- (as shown on the attached drawing sheet)

Sheet 2 of 12, Fig. 2:
Delete "45°c" and insert --45 °C-- (as shown on the attached drawing sheet)

Sheet 4 of 12, Fig. 4, and on the Title Page, the illustrative print figure, Reference Numeral 104, Line 1:
Delete "(AB)" and insert --(A/B)-- (as shown on the attached drawing sheet)

In the Claims

Column 10, Claim 7, Line 25:
Delete "range," and insert --range;--

Column 12, Claim 14, Line 15:
Delete "A" and insert --The--

Column 12, Claim 15, Line 36:
Delete "A" and insert --The--

Signed and Sealed this
Twenty-ninth Day of August, 2023

Katherine Kelly Vidal
*Director of the United States Patent and Trademark Office*